US000001102H

United States Statutory Invention Registration [19]

[11] Reg. Number: H1102

McClellan [43] Published: Sep. 1, 1992

[54] FLUIDIC LASER CALORIMETER

[75] Inventor: Gordon R. McClellan, Ridgecrest, Calif.

[73] Assignee: The United States of America as represented by the Secretary of the Navy, Washington, D.C.

[21] Appl. No.: 764,570

[22] Filed: Sep. 16, 1991

[51] Int. Cl.[5] ..... G01K 17/20

[52] U.S. Cl. ..... 374/32; 374/35

[58] Field of Search ..... 374/31, 32, 35

[56] References Cited

U.S. PATENT DOCUMENTS

| | | | |
|---|---|---|---|
| 2,451,724 | 10/1948 | Evans | 324/95 |
| 2,846,647 | 8/1958 | MacPherson | 324/95 |
| 3,040,252 | 6/1962 | Novak | 324/95 |
| 3,143,703 | 8/1964 | Kraeuter | 324/95 |
| 3,600,669 | 8/1971 | McClain | 340/870.35 |
| 3,670,570 | 6/1972 | Briones | 374/32 |
| 3,747,401 | 7/1973 | Johnson | 374/32 |
| 4,223,264 | 9/1980 | Yamamura et al. | 324/95 |
| 4,325,252 | 4/1982 | Miller et al. | 374/32 |
| 4,524,624 | 6/1985 | Di Noia et al. | 73/708 |
| 4,968,150 | 11/1990 | Mathews et al. | 374/32 |

FOREIGN PATENT DOCUMENTS

| | | | |
|---|---|---|---|
| 0362248 | 2/1973 | U.S.S.R. | 324/106 |
| 0839992 | 6/1960 | United Kingdom | 324/95 |
| 1009163 | 11/1965 | United Kingdom | 324/95 |

OTHER PUBLICATIONS

Clogston, A., abstract of Ser. No. 608,291, filed Aug. 1, 1945.

Meahl, H., abstract of Ser. No. 706,894, filed Oct. 31, 1946.

Damon, E. et al., "A Liquid Calorimeter for High-Energy Lasers," Applied Optics, vol. 2, No. 2, pp. 163-164 (Feb.1963).

Scott, B., "Laser Energy Measurements with a Liquid Absorption Cell," J. Sci. Instrum., vol. 43, pp. 940-942 (1966).

Wharton, C., "Calorimetric Measurements of Single-Pulse High Power Microwaves in Oversized Waveguides," Dev. Sci. Instrum., vol. 57, No. 5, pp. 855-858 (May 1986).

Gunn, S., "Calorimetric Measurements of Laser Energy and Power," J. Phys. E; Scientific Instruments, vol. 6, No. 2, pp. 105-114 (Feb. 1973).

Rasmussen, A., "Laser Energy and Power Measurements with a Double Reflecting Plate Calorimeter," Rev. Sci. Instrum., vol. 41, No. 10, pp. 1479-1484 (Oct. 1970).

*Primary Examiner*—Bernarr E. Gregory

*Attorney, Agent, or Firm*—Melvin J. Sliwka; Harvey A. Gilbert

[57] ABSTRACT

A laser calorimeter which operates by absorbing the energy of a laser beam directed through a lens at the front of the calorimeter. The calorimeter contains a absorbing medium with high absorbance characteristics at the laser wavelength in question. The absorbed laser energy is converted to heat. The device has a means for measuring the changes in temperature of the absorbing medium as well as a means for measuring the changes in pressure inside the calorimeter chamber. The absorbing medium is typically a liquid which also demonstrates preferable heat transfer characteristics. This in turn affords greater precision and a faster response time of the calorimeter when measuring the laser energy. A typical medium for such a device is a dimethylformamide solution which has extremely good absorbance characteristics for an optical path length of 0.015 inches at a laser wavelength of 1.064 microns.

17 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLUIDIC LASER CALORIMETER

BACKGROUND OF THE INVENTION

The present invention relates to calorimeters and more particularly to the means for accurately measuring energy of laser beams.

There exists a need for a simple and relatively low cost method of accurately measuring the energy levels of numerous scientific and industrial lasers. Calorimeters are a standard device used in most high-energy laser applications and their development. However, a calorimeter capable of measuring the laser energy with great precision and with a fast response time is often complex and tends to be expensive.

The prior art in this area of energy measurement for lasers typically use radiation detectors to measure the power of the laser beams. Such energy measuring devices have limited power ranges and limited accuracy due to the presence of detector noise. The use of a thermopile in laser power meters is also known as a common method to measure laser energy. These meters use a block of metal which is heated with the laser beam. The temperature rise in the metal block is used to determine the laser power. Accurate models of such devices are available but tend to be relatively expensive. The less expensive models have poorer accuracy.

SUMMARY OF THE INVENTION

It is the object of this invention to provide a device for accurately measuring the energy of a laser beam.

It is a further object of this invention to provide a device for converting the energy of a laser beam to thermal energy or heat.

Yet another object of this invention is to provide a device for absorbing the energy of a laser beam of specified wavelengths.

It is still a further object of this invention to provide a device for measuring the energy of individual pulses of a pulsed laser source.

It is still a further object of this invention to provide a device for converting the energy of a pulsed laser source to an increase in internal pressure and thermal energy.

It is still a further object of this invention to provide a device for measuring the repetition rate of a pulsed laser source.

It is still a further object of this invention to provide a device for absorbing the energy of a pulsed laser source at a specified wavelength.

It is still a further object of this invention to provide a device for determining the absorbance characteristics of fluidic or gaseous mediums at specified wavelengths.

A key feature of this invention is a simple method of modifying or adjusting the device to increase or decrease the measurement sensitivity with respect to the various wavelengths of the laser beams to be measured.

Another key feature of this invention is the utilization of a fluid medium, such as a liquid or a gas, for absorbing the energy of a laser beam of specified wavelengths.

Yet another feature of this invention is the capability of measuring the temperature changes and pressure changes in a confined chamber which has been subjected to a directed laser energy source. There exist many alternative configurations to the present invention which employ varying techniques of measuring the temperature and pressure changes within the chamber. Such flexibility permits this device to be tailored to a specific application, integrated within a more complex apparatus or to be used in stand-alone applications.

The present invention is a laser calorimeter. It provides an accurate means to measure the energy of a continuous or pulsed laser beam at a relatively low cost. A laser beam is directed at the calorimeter and passes through a lens into the calorimeter chamber. The calorimeter chamber is filled with an absorbent fluid medium in a liquid or gaseous state. Once inside the chamber the laser energy is absorbed by the absorbent medium. The absorbed energy is converted to thermal energy or heat thereby causing the temperature of the medium to rise. The internal chamber pressure will also rise. The present invention utilizes various means to measure the increase in temperature and pressure. The resulting increases in temperature and pressure can then be used to calculate the energy absorbed by the medium.

The laser energy of individual pulses for a pulsed laser can also be absorbed, converted to alternate energy forms, and ultimately calculated or measured. A pressure transducer or other similar device presents the best alternative within the present embodiment for converting laser energy to an alternate energy form and determining the number of individual pulses over a specified time frame. This value together with the measured value of the total laser energy absorbed, as described in the preceding paragraph, can be used to calculate the energy of individual pulses.

The present invention allows the use of different absorbent mediums, such as liquid dyes, within the calorimeter chamber which alters the absorbing characteristics of the calorimeter. Depending on the application and design, one can achieve near total absorption, or partial absorption if so desired. Further, it is possible to determine the absorption characteristics of a known or unknown medium at specific wavelengths, if the energy output and wavelength of the source are known. If only partial absorption is desired, or the absorption characteristics are to be determined, the laser beam would pass through the medium and exit the calorimeter through another lens. In this manner it is also possible to have the present invention act more as a filter by absorbing certain wavelengths of laser light and allowing other wavelengths to pass through.

One important feature of the present invention is the ability to control the volume of the fluid dye solution or concentration of the fluid dye solution or both. Such control allows for greater resolution, accuracy, and sensitivity of the calorimeter with various lasers and the length of time exposed to the laser energy.

The present invention satisfies the aforementioned objectives and incorporates the preceding features in a manner that will be apparent from consideration of the drawings and the detailed description of the invention which follows.

DETAILED DESCRIPTION

Figure 1:
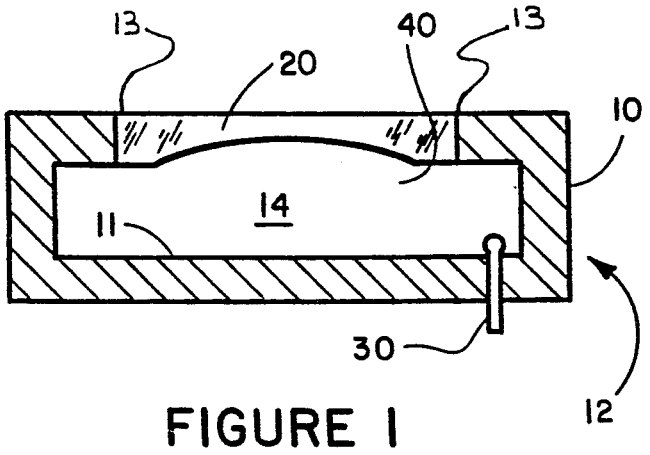
FIG. 1 is a cross section view of the present invention in a single lens configuration.

Referring to FIG. 1 the present invention (12) in a preferred embodiment is shown consisting of a housing (10) and a lens (20) attached to an opening (13) at a front end of the housing 10) thereby creating an enclosed chamber (40). The chamber (40) contains an absorbent solution (14) which is shown here as a liquid dye solution. The interior surface (11) of the housing (10) can be mirrored so as to cause the light energy to reflect back through the absorbent solution (14) prior to escaping and avoids any energy being absorbed by the housing (10). This feature improves the overall accuracy and sensitivity of the device. By passing the laser energy through the absorbent solution (14) multiple times, the volume of the absorbent solution (14) needed to absorb nearly all the energy can be reduced. A reduced volume of the absorbent solution (14) will cause greater temperature rises for a given amount of absorbed energy.

Also shown in the chamber (40) and protruding through the housing (10) is a thermistor (30) which is used to measure the temperature of the absorbent solution (14). The thermistor is connected to a automated recording device such as a computer (not shown) or other peculiar test equipment (not shown) which records the resultant values of the thermistor (30) and calculates the absorbent solution (14) temperature. The temperature measurements can then be used to determine the energy absorbed by the absorbent solution (14). The use of a thermistor (30) in the present invention is merely one method of measuring temperature. Various alternatives such as a thermocouple or other thermometer device can be used with the invention in lieu of a thermistor (30). Further, the absorbent solution (14) can be replaced with any liquid or gaseous medium possessing the absorbent characteristics desired for the given application or use.

As stated earlier, the present invention is a laser calorimeter (12). A laser beam (not shown) of a specified wavelength is directed toward the device and passes through the front lens (20) and into the chamber (40). The chamber (40) contains a liquid dye solution which has specific absorbance characteristics at the laser wavelength in question. In the preferred embodiment a liquid dye solution containing dimethylformamide solvent is contained within the chamber (40). Specifically, the liquid dye solution used in the prototype invention contained one milliliter of dimethylformamide solvent per 55 milligrams of dye. This dye solution has a very high absorbance at the ND:Yag wavelength of 1.064 microns. At the concentration stated above approximately $1\times10^{(-50)}$ of the light would not be absorbed at an optical path length of 0.015 inches. It is clear however, that numerous dye solutions could be used as the absorbent solution (14) in the present invention (12). Further, the characteristics, materials, and dimensions of the housing, chamber, and lens can be tailored to the specific application. The overriding consideration when making such selections is the compatibility of the various components including the laser wavelength and power, properties of the absorbent, and length of time the present invention is exposed to the laser beam. A preferred embodiment of the present invention uses a three-fourths inch diameter circular glass convex lens of predetermined thickness, a small stainless steel housing approximately two inches by two inches by one-half inch and having an chamber volume of less than twenty cubic centimeters. Alternate lens configurations include but are not limited to a convexo-convex, convexo-concave, plano-convex, plano-concave, concavo-convex, or concavo-concave lens.

As a laser beam (not shown) enters the chamber (40) it is absorbed by the absorbent solution (14). All the absorbed laser energy is converted to heat. By measuring the temperature rise in given volume of absorbent solution (14) the amount of heat generated and correspondingly, the amount of absorbed energy can be determined.

Figure 2:
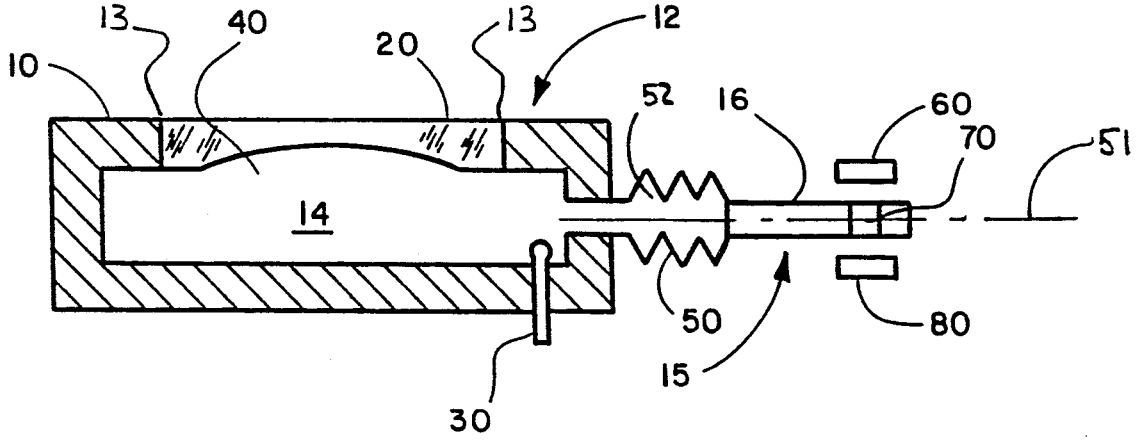
FIG. 2 is similar to FIG. 1, showing the present invention in an alternate configuration for measuring internal pressure as well as temperature.

An alternate configuration of the present invention is show in FIG. 2. This device is similar to the device shown in FIG. 1 but has additional features. As can be seen, this device consists of a housing (10) and a lens (20) attached to the opening (13) at a front end of the housing (20) thereby creating an enclosed chamber (40). The chamber (40) contains an absorbent solution (14) which is shown here as a fluid dye solution similar to that described above. The interior surface (11) of the housing (10) can be mirrored as described above so as to cause the light energy to reflect back through the absorbent solution (14) prior to escaping and avoids any energy being absorbed by the housing (10). Also shown in the chamber (40) and protruding through the housing (10) is a thermistor (30) which is used to measure the temperature of the absorbent solution (14). The thermistor (30) is connected to a automated recording device such as a computer (not shown) or other peculiar test equipment (not shown) which records the resultant values of the thermistor (30) and calculates the temperature of the absorbent solution (14). The temperature measurements can then be used to determine the energy absorbed by the absorbent solution (14).

An additional feature of this configuration is the pressure transducer (15) which measures the pressure changes in the calorimeter chamber (40). As shown in FIG. 2, the pressure transducer (15) is located on one side of the housing (10). The pressure transducer (15) shown in this configuration is a bellows structure (50), having an interior cavity (52). This bellows structure (50) converts the pressure variations or changes into linear motion. A linear variable differential transformer (LVDT) (16) is attached to the end of the bellows structure (50) and aligned along the axis of linear motion (51).

The linear variable differential transformer (LVDT) (16) is comprised of a transformer core 70), a transformer coil (60) of an electrical circuit (not shown) disposed slightly above the transformer core (70) and a second transformer coil (80) of an electrical circuit (not shown) disposed slightly below the transformer core (70). The transformer core (70) is rigidly attached to the end of the bellows structure (50) such that the transformer core (70) moves simultaneously along the same motion axis (51) as the bellows structure (50) when the bellows structure (50) is expanded and compressed due to pressure variations inside the chamber (40). The transformer coils (60,80) are an integral part of electrical circuits (not shown) whose output voltages are measured and recorded on a device such as a computer (not shown) or other peculiar test equipment (not shown) which records the resultant output values of the circuits, and calculates and monitors over time the internal pressure of the chamber (40). The pressure measurements can then be used to determine the number of distinct pulses of a pulsed laser energy source and ultimately the laser energy per pulse.

The use of a bellows structure (50) in the present invention is merely one method of measuring pressure variations. Various alternatives such as a conventional diaphragm or other pressure sensing devices can be used with the invention in lieu of a bellows structure (50).

The manner of operation of the configuration shown in FIG. 2 is similar to that described above. A pulsed laser beam (not shown) of a specified wavelength is directed toward the device and passes through the front lens (20) and into the chamber (40). The chamber (40) contains an absorbent solution (14) which has specific absorbance characteristics at the laser wavelength in question. As discussed above, numerous dye solutions could be used as the absorbent solution (14) in the present invention.

As the pulsed laser beam (not shown) enters the chamber (40) it is absorbed by the absorbent solution (14). By measuring the pressure variations over time in the chamber (40) due to the fluid dye solution absorbing the laser energy, it is possible to determine the number of pulses in a given time period. Each individual pulse will cause a discrete rise in the internal pressure of the chamber (40). This allows the measurement of the laser repetition rate. The laser repetition rate along with the measured power allows the determination of energy per pulse for a pulse laser source. The total laser energy of a pulsed laser source can be measured as discussed above using a temperature sensor such as a thermistor (30) in addition to a pressure sensing device.

Figure 3:
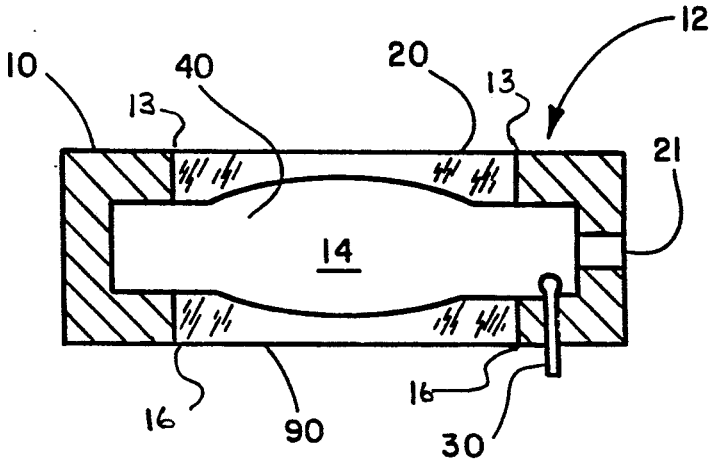
FIG. 3 is a cross section view of the present invention in a dual lens configuration.

Yet another configuration is shown in FIG. 3. This device is also similar to the devices shown in previous figures but has additional features. As can be seen, this device consists of a housing (10) and a first lens (20) attached to the opening (13) at the front end of the housing (10) and a second lens (90) attached to the opening 16) in the aft end of the housing (10) thereby creating an enclosed chamber (40). The chamber (40) contains an absorbent solution (14) which is shown here as a fluid dye solution similar to that described above. Also shown in the chamber (40) and protruding through the housing (10) is a thermistor (30) which is used to measure the temperature of the absorbent solution (14). The thermistor (30) is connected to a automated recording device such as a computer (not shown) or other peculiar test equipment (not shown) which records the resultant values of the thermistor (30) and calculates the temperature of the absorbent solution (14). The temperature measurements can then be used to determine the energy absorbed by the absorbent solution (14).

The additional features of this configuration is the presence of a second lens (90) which enable this device to filter laser light at specified wavelengths by absorption as described above while permitting the other wavelengths to pass through. Also, the presence of the removable plug (21) allows the absorbent solution (14) to be replaced as the design and application requirements dictate. Clearly, this plug (21) can also be employed in any of the configurations of the present invention as described above.

Furthermore, use of the dual lens configuration allows the determination of absorbent characteristics of various absorbent solutions (14) at specified wavelengths. Knowing the energy and wavelength of the directed laser beam (not shown), and the optical path dimensions or distance between the first lens (20) and the second lens (90) of the device, the absorbent characteristics can be calculated by measuring the energy absorbed by the absorbent solution (14) within the housing chamber (40) using the thermistor (30) as discussed earlier in the operation of the basic laser calorimeter.

What I now claim as the invention is:

1. A laser calorimeter for measuring laser energy comprising:
   - a housing having a forward end defining an opening and an interior chamber, said chamber having an interior surface opposite said opening;
   - a lens disposed in said opening of said housing and attached peripherally thereto whereby said laser energy may enter said housing chamber;
   - a means disposed in said chamber for absorbing said laser energy in said housing chamber; and
   - a means extending sealably through said housing and into said chamber for measuring changes in temperature in said means for absorbing said laser energy.

2. The laser calorimeter for measuring laser energy of claim 1 further comprising a means extending sealably through said housing and into said chamber for measuring changes in pressure in said housing chamber.

3. The laser calorimeter of claim 2 wherein said interior surface opposite said lens comprises a mirror surface.

4. The laser calorimeter of claim 2 wherein said lens comprises a plano-convex lens.

5. The laser calorimeter of claim 2 wherein said means for measuring changes in temperature in said housing chamber comprises a thermistor.

6. The laser calorimeter of claim 2 wherein said means for absorbing said laser energy comprises a liquid dye solution disposed in said housing chamber.

7. The laser calorimeter of claim 6 wherein said liquid dye solution comprises a mixture having known specific absorbance characteristics of laser energy at specific wavelengths.

8. The laser calorimeter of claim 7 wherein said liquid dye solution comprises a mixture containing insert dye solution and dimethylformamide.

9. The laser calorimeter of claim 7 wherein said liquid dye solution comprises a mixture containing 55 mg of said dye solution per milliliter of dimethylformamide.

10. The laser calorimeter of claim 2 wherein said means for measuring changes in pressure comprises a pressure transducer attached to said housing and extending sealably into said chamber.

11. The laser calorimeter of claim 10 wherein said pressure transducer comprises:
   - a bellows structure having an axis of linear motion and further having a cavity;
   - a linear variable differential transformer disposed on said bellows structure along said axis of linear motion; and
   - a means for attaching said pressure transducer to said housing so that said chamber extends sealably into said bellows cavity.

12. The laser calorimeter of claim 11 wherein said linear variable differential transformer comprises:
   - a transformer core component having a first side and a second side opposite said first side;
   - a transformer coil element of an electrical circuit disposed near said first side of said transformer core;
   - a transformer coil element of an electrical circuit disposed near said second side of said transformer core; and a means for attaching said transformer core to said extension bellows whereby said transformer core moves in the direction of the axis of linear motion with pressure changes inside said chamber.

13. A laser calorimeter for measuring laser energy of a laser beam comprising:

a housing having a forward end defining a first opening, an interior chamber, and an aft end defining a second opening opposite said first opening;

a first lens disposed in said first opening of said housing whereby said laser beam may enter said housing chamber;

a means disposed in said chamber for absorbing said laser energy of said laser beam;

a means extending sealably through said housing and into said chamber for measuring changes in temperature in said chamber; and a second lens disposed in said second opening of said housing whereby said laser beam may exit said housing chamber.

14. The laser calorimeter of claim 13 wherein said first lens and said second lens comprise a first plano-convex lens and a second plano-convex lens respectively.

15. The laser calorimeter of claim 13 wherein said means for measuring changes in temperature in said housing chamber comprises a thermistor.

16. The laser calorimeter of claim 13 wherein said means for absorbing said laser energy of said laser beam comprises a liquid dye solution disposed in said housing chamber.

17. A laser calorimeter for measuring laser energy comprising:

a housing having an interior chamber;

an optical means for communicating said laser energy with said chamber, said means extending sealably through said housing so that said laser energy may pass through said optical means;

a means disposed in said chamber for absorbing said laser energy in said housing chamber; and a means extending sealably through said housing and into said chamber for measuring changes in temperature in said means for absorbing said laser energy.

* * * * *